Figure 1:
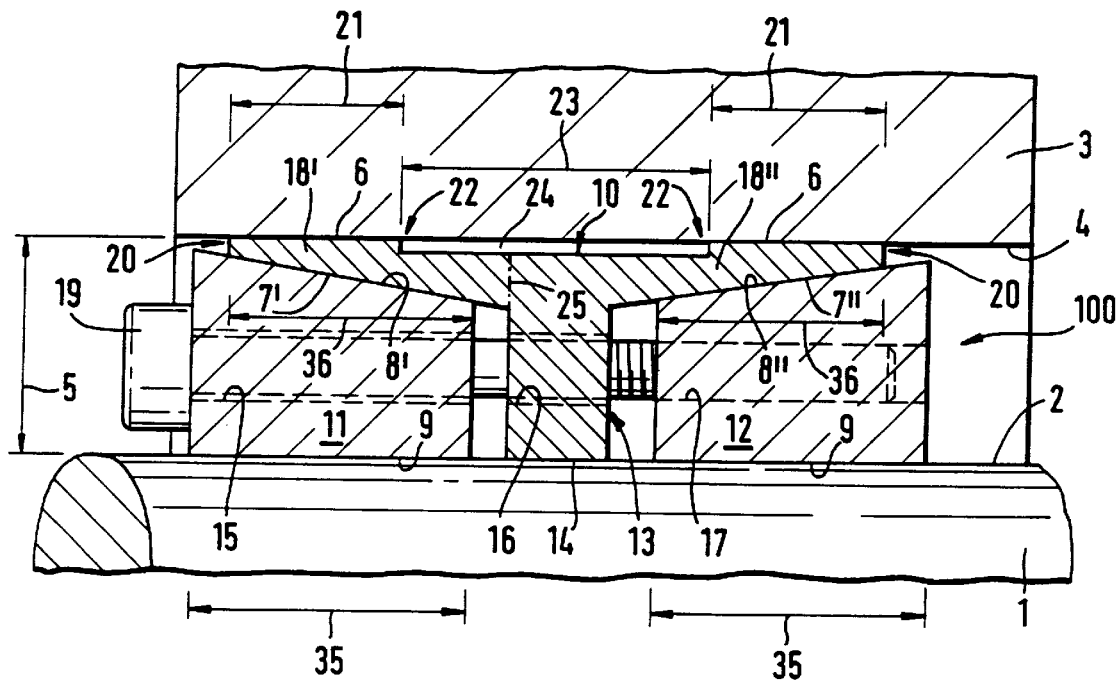

United States Patent [19]
Mullenberg

[11] Patent Number: 6,099,199
[45] Date of Patent: Aug. 8, 2000

[54] CONE CLAMPING SET

[76] Inventor: Ralph Mullenberg, Im Wiesengrund 6, D-41516 Grevenbroich, Germany

[21] Appl. No.: 09/180,828

[22] PCT Filed: Apr. 12, 1997

[86] PCT No.: PCT/DE97/00740

§ 371 Date: Nov. 13, 1998

§ 102(e) Date: Nov. 13, 1998

[87] PCT Pub. No.: WO97/43556

PCT Pub. Date: Nov. 20, 1997

[30] Foreign Application Priority Data

May 15, 1996 [DE] Germany ............... 296 08 751 U

[51] Int. Cl.⁷ .................................................. F16D 1/06
[52] U.S. Cl. .................................... 403/370; 403/374.4
[58] Field of Search ............................. 403/367, 368, 403/369, 370, 371, 373, 374.4, 374.3, 374.2, 374.1, 375

[56] References Cited

U.S. PATENT DOCUMENTS

| | | | |
|---|---|---|---|
| 3,847,495 | 11/1974 | Peter et al. ........................ | 403/370 |
| 3,958,888 | 5/1976 | Mullenberg . | |
| 4,025,213 | 5/1977 | Schafer et al. ..................... | 403/370 |
| 4,115,016 | 9/1978 | Muellenberg . | |
| 4,186,570 | 2/1980 | Pokrandt ........................... | 403/370 X |
| 4,411,551 | 10/1983 | Adelbratt .......................... | 403/370 |
| 4,702,635 | 10/1987 | Muellenberg ..................... | 403/370 X |
| 4,702,637 | 10/1987 | Muellenberg ..................... | 403/373 |
| 5,263,802 | 11/1993 | Fichot et al. ...................... | 403/370 X |
| 5,476,337 | 12/1995 | Mullenberg . | |
| 5,558,457 | 9/1996 | Mullenberg . | |
| 5,639,176 | 6/1997 | Mullenberg . | |
| 5,775,831 | 7/1998 | Mullenberg . | |
| 5,993,102 | 11/1999 | Miyako ............................. | 403/370 |

FOREIGN PATENT DOCUMENTS

| | | |
|---|---|---|
| 1 165 941 | 3/1964 | Germany . |
| 1 194 651 | 6/1965 | Germany . |
| 1 231 493 | 12/1966 | Germany . |
| 7 133 914 | 5/1973 | Germany . |
| 7 512 290 | 12/1975 | Germany . |
| 2 444 104 | 12/1976 | Germany . |
| 2 609 042 | 5/1977 | Germany . |
| 7 727 308 | 1/1978 | Germany . |
| 2 759 306 | 6/1979 | Germany . |
| 2 074 290 | 10/1981 | United Kingdom . |

OTHER PUBLICATIONS

International Search Report, dated Oct. 6, 1997.
International Preliminary Examination Report, dated Aug. 7, 1998.

*Primary Examiner*—Harry C. Kim
*Attorney, Agent, or Firm*—Vickers, Daniels & Young

[57] ABSTRACT

The conical clamping set (100) serves, for example, to connect a shaft (1) with a hub (3) and is arranged in the radial clearance (5) between the cylindrical outer-circumference surface (2) of the shaft (1) and the cylindrical inner-circumference surface (4) of the hub (3). It includes inner conical rings (11, 12) with a cylindrical inner-circumference surface and a conical outer-circumference surface (8', 8"), as well as a thin-walled external conical ring (10, 18', 18") with conical, inner-circumference surfaces (7', 7") fitting onto the outer-circumference surfaces (8', 8") of the inner conical ring (11, 2) and a cylindrical outer-circumference surface (6) intended for application on the inner-circumference surface (4) of the hub (3). Axial clamping screws (19) are distributed over the circumference; the conical rings (11, 12) can be axially pulled against each other by tightening the clamping screws. Because of a radial stepping down (24) or circumference slot, the axial extension of the zone (21) of the cylindrical outer-circumference surface (6) of the external conical ring (10), in which the radial clamping forces are transferred to the inner circumference of the recess (4) of the hub (3), is smaller than the axial extension of the zone (35), in which the radial clamping forces act against the outer circumference (2) of the shaft (1), so the surface pressure on the surfaces (4, 6) is increased.

8 Claims, 3 Drawing Sheets

CONE CLAMPING SET

The invention involves a conical clamping set of a type that corresponds to the characterizing clause of claim 1.

Clamping sets of this type are known in many cases both as simple clamping sets and as double-cone clamping sets, e.g. from DE-GM 71 33 914, 77 27 308 and 75 12 290, as well as from U.S. Pat. No. 3,958,888.

Figure 4:
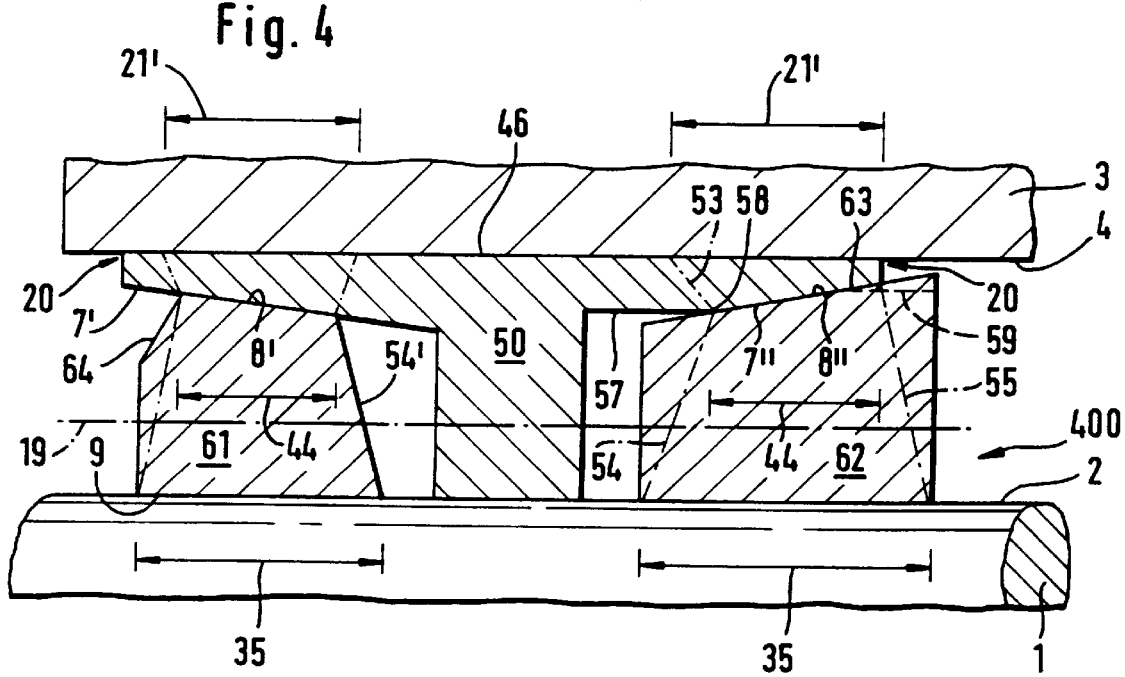

The invention's problem resulted from clamping sets that correspond to FIG. 4 of U.S. Pat. No. 3,958,888. The double-cone ring is the external cone ring there, and it fits in a hub bore hole with its cylindrical outer-circumference surface. The conical inner-circumference surfaces are arranged in such a way that the largest wall thickness of the double-cone ring is in the center. A centering crosspiece is provided in the middle, which extends up to the shaft, and consequently makes a centering of the hub possible vis-a-vis the shaft. The clamping screws axially reach through the two individual conical rings; the screws reach through the clearance holes in the one conical ring and in the centering crosspiece, and reach into the threaded holes of the opposite conical ring. The individual conical rings have, on the whole, a larger wall thickness than the double-cone ring in a radial direction in the transfer area of the clamping forces because they take in the clamping screws, so the double-cone ring changes dimensions easily and readily fits into the inner circumference of the recess in the external component. "Thin-walled" should mean, here and in further contexts, that the radial wall thickness at every point in the zone in which the radial forces are transferred is at most half of the radial wall thickness of the internal conical ring, in general, however, only one-third or one-fourth of this wall thickness.

If, for example, a belt driving drum for belt conveyors is attached to a shaft with a conical clamping set of this type, the shaft experiences a substantial bending stress through the pull of the conveyor belt; the bending stress can lead to a noticeable deflection of the shaft. This in turn has the consequence that the outer-circumference surface of the external double-cone ring can slightly move away from the inner-circumference surface of the hub on the external side of the bending, even if the conical clamping set was initially completely tight when the bracing at the edge took place.

This intermittent movement of the external double-cone ring away from the hub bore hole suffices to allow moisture to penetrate at this point, which leads to the feared frictional corrosion there that can make later disassembly of the conical clamping set impossible because the joint surfaces are rusted together. In the case of the example of the belt driving drum, the water comes from the axially external side, which is exposed to the weather.

The point at which the moving away occurs circulates around with the rotation of the shaft, so a ring-shaped rust zone forms.

The penetration of the moisture and the subsequent formation of frictional corrosion primarily arises on the outside of the conical clamping set, so in a zone lying on the axial edge of it, on the radially external circumferential surface fitting into the hub, because lower surface pressure prevails there, and the forces arising because of the bending exceed the clamping forces at this point to begin with.

The problem of avoiding an appearance of frictional corrosion of this type is at the root of the invention.

This problem is solved by the measure described in claim 1.

The axial zones in which the radial clamping forces are transferred are normally approximately equal at the inner component, for example the shaft, and the external component, for example the hub. This leads to the surface pressure on the outside being lower than that on the inside, i.e. on the shaft, because of the larger radius and the corresponding larger surface available for transferring force. The idea that is at the root of the invention consists in reducing the axial zones on the outside that are available for the transfer of the radial forces and to artificially increase the surface pressure on the outside in this way. Even fairly high bending forces thereby no longer exceed the increased clamping forces when there are normally-occurring bending conditions, and the application of contact of the clamping set remains in the external edge area, so none of the moisture that causes the frictional corrosion can penetrate. This means that fairly high bending can be tolerated without the ability to function being impaired. Experience has shown that, in the case of bending loads that come about in practice, a contact application tension or surface pressure of 70–80 N/mm$^2$ remaining, when there is bending, on the side external to the bending is still sufficient to prevent the penetration of water and can consequently prevent frictional corrosion. This remaining surface pressure only arises, because of the arrangement in accordance with the invention, when there are fairly large bending moments. The artificial increase of the surface pressure in the recess of the outer component contributes to better support in this recess and moreover takes a burden off the clamping screws.

The reduction of the outer zone can take place, for example, in such a way that the surface pressure in the recess of the external component, so the hub for example, has approximately the same magnitude as that on the inner component, so the shaft for example (claim 2).

The reduction of the force-transfer zone and the increase accompanying that of the surface pressure in the recess of the external component can be realized in different ways.

In the case of the first design form according to claim 3, the cylindrical outer-circumference surface of the external conical ring forming the outer zone is axially reduced.

In the case of a further design form that is under consideration (claim 4), the conical outer-circumference surface of the inner conical ring forming the outer zone is axially reduced vis-à-vis its cylindrical inner-circumference surface.

This reduction can be achieved in accordance with claim 5 through a cone-shaped formation of the axial faces of the inner conical ring.

This design form requires a processing effort, though, which will call into question the economic efficiency in many cases. The more economical alternative is therefore usually seeing that, in accordance with claim 6, the aforementioned outer-circumference surfaces are stepped down to a smaller diameter over an axial section. The application and the transfer of the radial clamping forces then only takes place in the areas that have not been stepped down.

A further design form that is under consideration (claim 7) provides for the conical inner-circumference surface of the outer conical ring passing over into a cylindrical surface at the thick-walled end, so that the desired reduction ensues.

The conical inner-circumference surface of the outer conical ring can also, in accordance with claim 8, be stepped down to a larger diameter through an axial section.

The effect of the invention is brought to bear in a particularly consistent way by the characteristic of claim 9.

The moisture being able to penetrate along the slot into the interior of the clamping set is prevented because of this, to be precise.

In the case of the preferred design example, the clamping set includes a double-cone ring and two individual conical rings interacting with that (claim 10); it is true that the double-cone ring can be an inner or outer ring in principle, but it is the external conical ring in the case of the preferred design form (claim 11).

In the case of this preferred design form, the reduction of the transfer length of the radial clamping forces at the inner circumference of the external component, e.g. the hub, can be brought about in accordance with claim 12 through a radial step-down in the direction of the circumference, or a flat circumference slot.

Design examples of the invention are presented in the drawing.

Figure 6:
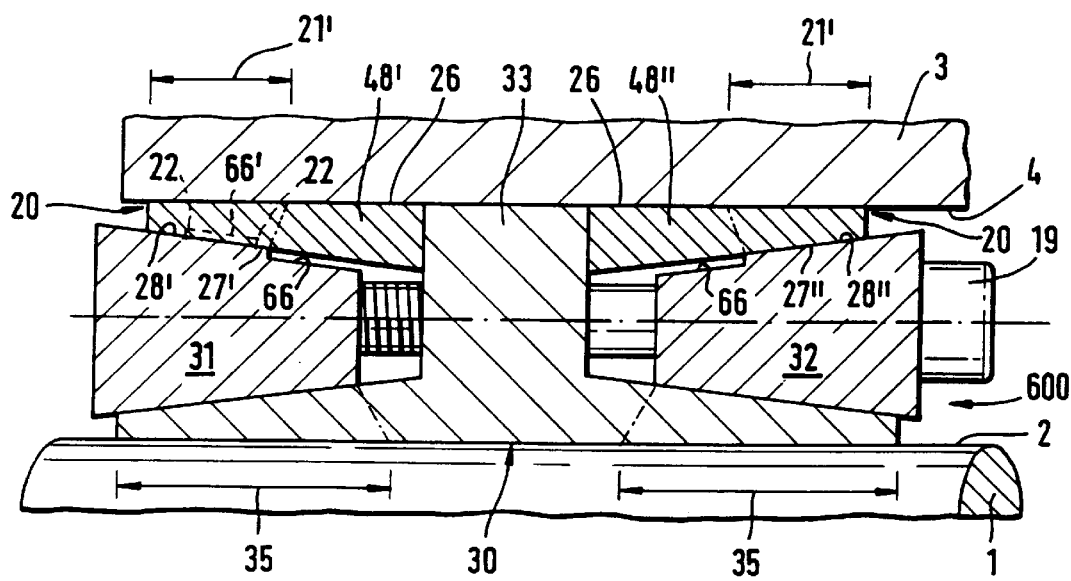

FIGS. 1 and 6 show broken-out sections of the upper part of a clamping arrangement of this type going through the axis of a clamping arrangement.

In FIG. 1, the double-cone clamping set designated in its entirety with 100 is for bracing a shaft 1 representing an inner component with a cylindrical outer circumference 2 with a hub 3 representing an external component with a recess with a cylindrical inner-circumference surface 4. The diameter of the inner circumference 4 is larger than the outer diameter of the shaft 1, and the clamping set 100 is housed in the ring-shaped clearance 5 that is formed.

The clamping set 100 includes a double-cone ring 10 with a cylindrical outer-circumference surface 6 and two conical inner-circumference surfaces 7', 7", which are arranged in such a way that their largest radial wall thickness lies in the center, viewed axially. The outer conical surfaces 8', 8" of two individual conical rings 11, 12, which fit in a contact application area on the outer-circumference surfaces 9 of the shaft 1 with their cylindrical inner-circumference surfaces 9, interact with the conical surfaces 7', 7"; the contact application area simultaneously forms the zone 35 of force transfer. The conical rings 11, 12 have, viewed radially, substantially thicker walls than the double-cone ring 10 in the area of its conical surfaces 7', 7". The ratio of the radial extensions is at least three to one at every point of the conical surface 7'. The double-cone ring 10 includes, in a certain sense, two thin-walled conical ring parts 18', 18" that are connected with each other.

The double-cone ring 10 has a centering crosspiece 13 projecting radially inwards between the conical surfaces 7', 7"; the centering crosspiece rests with its cylindrical inner-circumference surface 14 on the outer-circumference surface 2 of the shaft 1 and serves to center the hub 3 on the shaft 1. Axial clamping screws 19 that are next to each other and distributed over the circumference are provided that reach through clearance holes 15 in the conical ring 11 and 16 in the centering crosspiece, and reach into the threaded holes 17 in the conical ring 12. When the clamping screws 19 are tightened, the conical rings 11, 12 are pulled against each other and slide down in the process with their conical surfaces 8', 8" on the conical surfaces 7', 7" of the double-cone ring 10 having the same cone angle and a corresponding radius. In the process, the conical ring pairs 18', 11 or 18", 12, as the case may be, expand radially and are applied with the cylindrical surfaces 6 or 9 on the cylindrical surfaces 4 or 2, respectively, under considerable surface pressure, so parts 1 and 3 are stuck together with each other.

The cone angle of the conical surfaces 7', 8' or 7", 8" can lie outside or inside of the self-locking area; in the latter case, axial forcing screws have to exist if the clamping set 100 is to be able to be disassembled again.

Two critical points on the external radial and external axial edge of the double-cone ring 10 are designated with 20 in FIG. 1. When there is a heavy deflection of the shaft 1, it can happen that the forces that arise because of this become greater than the radial clamping forces, and the double-cone ring moves away from the inner-circumference surface 4 in the external areas of its conical ring parts 18', 18'. Moisture can then penetrate there, which can lead to frictional corrosion, which can make a disassembly of the conical ring 100 impossible or make it very difficult in any case.

The conical rings 11, 12 and the conical ring parts 18', 18" are normally adjacent to each other on axial sections 36. The section 36 gets closer to the length of the conical rings 11, 12, especially when there is a heavily-tightened clamping set 100 or an unfavorable position of the tolerances. The surface pressures on the conical surfaces 7', 8' and 7", 8", or between the cylindrical outer-circumference surface 6 and the inner circumference 4, are then significantly lower then between the inner-circumference surfaces 9 and the outer-circumference surface 2 of the shaft 1 because of the larger radii.

To artificially increase the surface pressure on the outside and to counteract the movement away at the points 20, step-down areas 22 are provided in the area of the sections 36 in the cylindrical outer-circumference surface of the double-cone ring 10; the outer-circumference surface 6 on a section 23 is stepped down between these areas to a lower radius or diameter. The depth of the stepping down or of the flat circumference slot 24 has to only be great enough that an application of the double-cone ring 10 to the inner-circumference surface 4 no longer takes place in the section 23. A magnitude of 1 mm suffices. It is important that the step-down areas 22 lie in the sector in which radial clamping forces would be transferred without the step-down areas 22.

The parts of the circumference surface 6 put in the section 23 would normally have played a part in the transfer of radial clamping forces, especially in the areas axially covered up with the conical rings 11, 12. When there is the same tightening of the clamping screws 19, these portions are now distributed over zones 21, i.e. the axially external areas of the outercircumference surface 6 that are at a standstill in the area of the semi-conical rings 18', 18", so that the radial application becomes stronger close to the critical points 20, and forces brought about through any deflections of the shaft 1, directed towards the semi-conical rings 18', 18" moving away from the inner-circumference surface 4 can no longer, or no longer so easily, exceed these application forces. Because of this, the clamping set 100 remains closed at the axially external edges of the double-cone ring 10 vis-à-vis the inner-circumference surface 4, so no moisture can penetrate. The zones 21 are axially shorter than the length 35 of the conical rings 11, 12, which correspond to the zone of force transfer on the shaft 1.

The double-cone ring 10 is, in any case, not slit in the area of its semi-conical rings 18', 18" for the same purpose, so that moisture cannot penetrate through the slot. The centering crosspiece 13 and the two conical rings 11, 12 can, on the other hand, be slit for the avoidance of force losses.

The double-cone clamping set 100 depicted in FIG. 1 is only a design example; a simple conical clamping set could also be involved, which arises, for example, by the double-cone ring 10 being thought of as cut off at the point marked in the dot-and-dash pattern line 25. The function of holding the clamping set closed when there is bending stress on the right, critical point 20 with a heavy deflection of the shaft 1 is also provided then.

Figure 2:
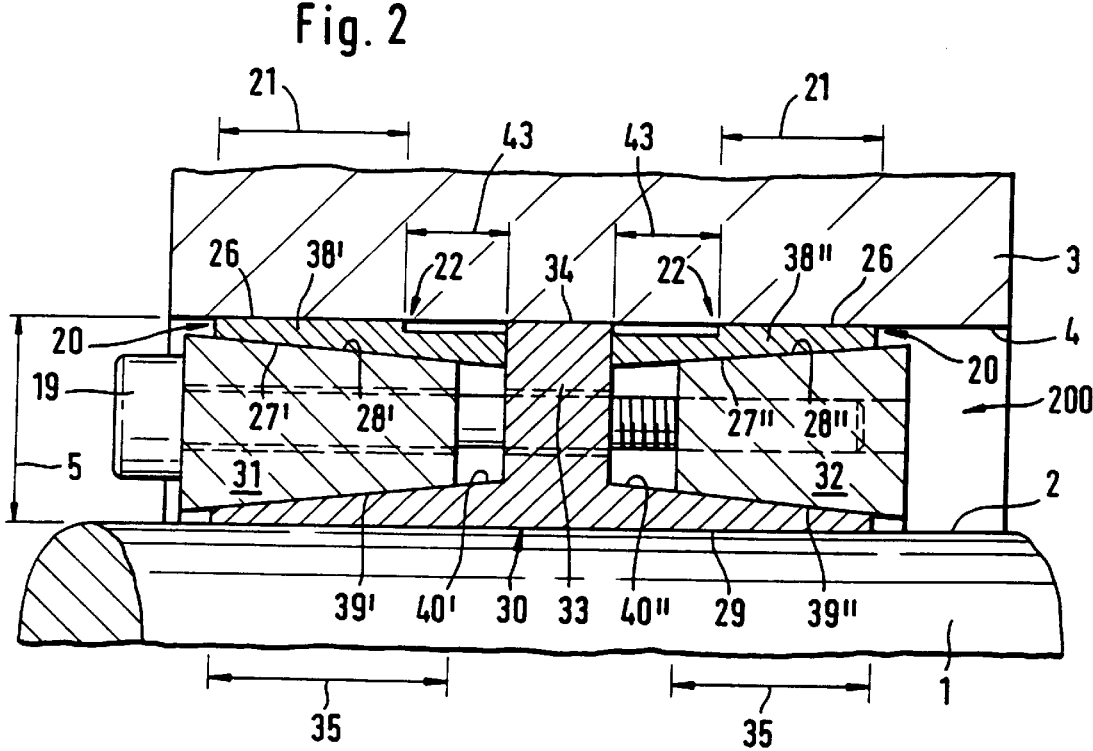

A double-cone clamping set 200 is reproduced in FIG. 2, in which functionally equivalent parts carry the same reference figures. A double-cone ring 30 is provided, which is an inner conical ring in that case and which fits on the shaft 1 with its cylindrical inner-circumference surface 29. The centering crosspiece 33 projects outwards in this case and fits with its cylindrical outer-circumference surface 34 on the cylindrical inner-circumference surface 4 of the external component, or the hub 3. The two conical rings 31, 32, which the clamping screws 19 act on, are provided in this case both with conical inner-circumference surfaces 39', 39" that interact with the conical outer-circumference surfaces 40', 40" of the double-cone ring 30, as well as with the conical outer-circumference surfaces 28', 28". They interact with the conical inner-circumference surfaces 27', 27" of two separate, unslit, external conical rings 38', 38", which fit with their cylindrical outer-circumference surfaces 26 on the inner circumference 4 of the hub 3. The external conical rings 38' and 38" fit with their inner faces against the centering crosspiece 33. The critical points 20 are positioned here on the radially and axially outer edge of the conical rings 38' and 38".

Step-down areas 22 are also provided here in the cylindrical outer-circumference surfaces 26 in the contact application areas. The cylindrical outer-circumference surfaces 26, to the inner end of the conical rings 38', 38" that are more thick-walled, are lowered at a section 43 to a smaller diameter at the step-down areas, so no application of pressure takes place there and the application force or surface pressure increases in the remaining zones 21 of the transfer of radial force, in order to protect the critical points 20 against opening up when there is a bending stress on the shaft 1. The axial length of the zone 21 is also smaller than the axial length of the zone 35 here, in which the inner conical rings 31, 32 transfer the radial clamping force inwards against the shaft.

In the previous design examples, the axial reduction of the zones 21, in which the radial force transfer takes place, is directly provided in the outer-circumference surface 6 or 26, as the case may be.

Because of the thin-walled characteristic of the external conical ring parts fitting on the inner circumference 4 of the hub 3, the desired effect also occurs, though, if the axial reduction of the force-transfer zone occurs not on the outer circumference of the clamping set, but instead on the first-neighboring conical surface, viewed radially from the outside.

Figure 3:
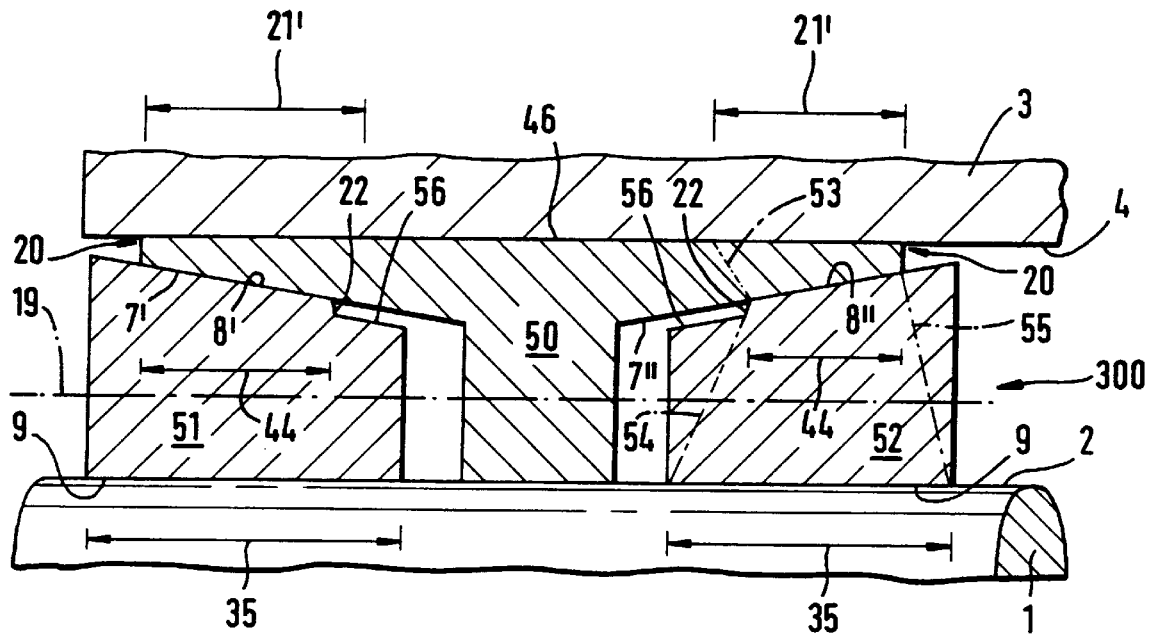

A case of this type is provided by the clamping set 300 of FIG. 3. The outer-circumference surface 46 of the double-cone ring 50 is continuously cylindrical here. The conical outer-circumference surfaces 8', 8" have, however, step-down areas 22 at which they are lowered to a smaller radius, so no contact takes place there any longer with the conical inner-circumference surfaces 7', 7" of the double-cone ring 50. In the design example, the outer-circumference surfaces of the inner conical rings 51, 52 run in parallel in the stepped-down range of the outer circumference of the stepping down 56 to the conical inner-circumference surfaces 7', 7", but in principle, the design in this range is arbitrary.

The force-transfer circumstances are indicated by the dot-and-dash pattern lines in the case of the right, inner conical ring 52 for the clamping set 300. The conical surfaces 7" and 8" are directly next to each other in an axial range 44. It is understood, however, that the force transfer at the radially separated application surfaces on the shaft 1 or the hub 3 is not restricted to the area 44 limited by levels going horizontally to the axis. The neighboring areas bear their share because of the inherent stability of the conical rings, as is indicated by the dot-and-dash pattern lines 54, 55 for the inner conical ring 52. The "Zone 21", in which the radial clamping force is transferred at the inner-circumference surface 4 containing the critical point 20, is not quite as short as the application area 44, but instead a bit longer, as is indicated by the dot-and-dash pattern line 53. The radial forces are likewise distributed against the outer-circumference surface 2 of the shaft 1 in accordance with the dot-and-dash pattern lines 54, 55. In any case, though, the zone 21' is still significantly shorter than the application area 35 of the inner conical ring 52 on the shaft 1.

Further possibilities are presented in the case of the clamping set 400 of FIG. 4 for reducing the axial zone of the indirect application on the conical surfaces 7', 8' or 7", 8" as the case may be.

In the case of the inner conical ring 62, the outer-circumference, conical surface 8" goes through the entire application range 35 in its cone-shaped course. This does not apply, though, for the conical, inner-circumference surface 7" of the double-cone ring 50, which passes from a point 58 that lies axially within the application area 35 over into a cylindrical surface 57, so the conical ring 62 no longer is next to its left end on the outside.

The cylindrical surface 59 on the right end of the conical ring 62, indicated by the dotted line, would achieve the same effect. The point 63 of the first application to the conical surface 7", viewed axially, would be located with some distance from the right end of the double-cone ring 50 here. The two cylindrical surfaces 57, 59 can also be present together.

In this case, the axial zone 21' of the force transfer on the inner circumference 4 of the hub 3 is also shorter than the application area 35 on the shaft 1.

The areas of the conical ring 62 lying outside of the dot-and-dash pattern lines 54, 55 are essentially uninvolved in the transfer of the radial clamping force. That is why they can also be removed without an influence on the clamping effect, as is indicated by the cone-shaped design of the right, front wall 54' of the conical ring 61, in accordance with FIG. 4. In general, though, the processing effort will not justify a cone-shaped design of this type.

On the left side, in accordance with FIG. 4, of the conical ring 61, there is also a cone-shaped lathed area 64, which reduces the area 44 of the actual application on the conical surfaces 7', 8'. The axial zone 21' of the force transfer to the inner-circumference surface 4 of the hub 3 is, at any rate, also shorter than the application area 35 on the shaft 1 in this case.

Figure 5:
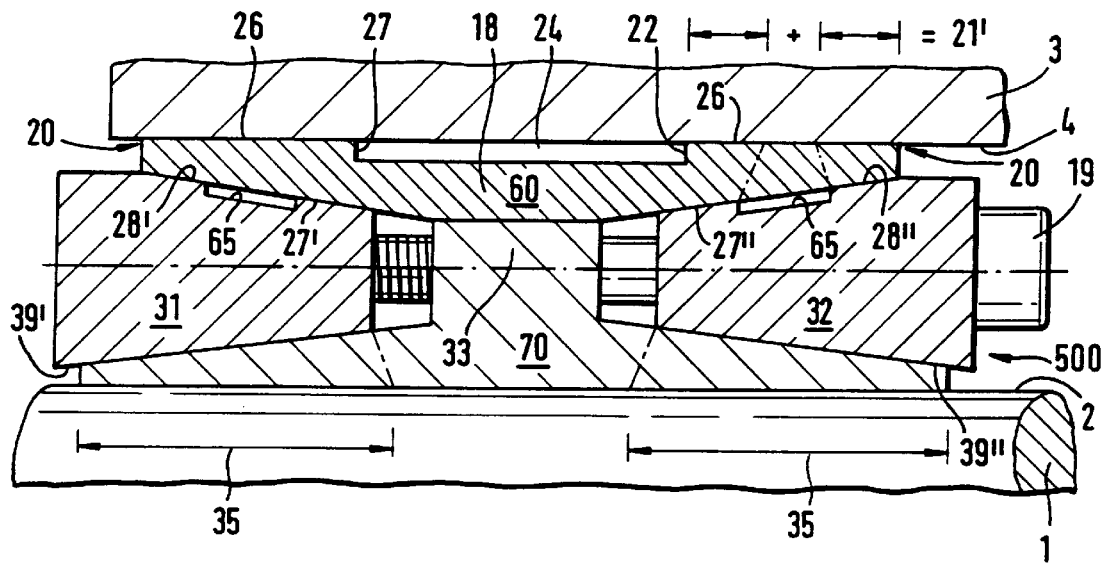

In the case of the clamping set 500 of FIG. 5, the two individual, external, conical rings 38', 38" are joined together into a double-cone ring 60, which doesn't have any centering crosspiece, but is instead next to the centering crosspiece 33 of an inner double-cone ring 70 from the inside. The external double-cone ring 60 has step-down areas 22, just as in FIG. 1, which limit a stepping down 24. The conical rings 31, 32 have conical outer-circumference and inner-circumference surfaces, just as in FIG. 2, which interact with the corresponding opposite surfaces of the double-cone rings 60, 70. The external conical surfaces 28', 28" have stepping down 65 in the center that take up one-sixth to half of the length of the force-transfer surface on the conical surfaces 27', 28'; 27", 28" and lead to the reduced zone 21' of the transfer of the radial clamping force, indicated on the right side according to FIG. 5 and consisting of two parts, arising in conjunction with the stepping down 24. The reduced zone is shorter than the corresponding zone 35 on the shaft 1.

The clamping set 600 of FIG. 6 is equivalent in its structure to the clamping set 200 of FIG. 2. The two external conical rings 48', 48" have a continuous, cylindrical outer-circumference surface 26, however. The reduction of the external zone 21' of the radial clamping force transfer is brought about in the case of the right conical ring 32 by a stepping down 66 in the conical outer-circumference surface 28", which is located at the inner end of same.

Step-down areas 22 are provided on outer circumference surfaces for the design examples. It is understood, however, that step-down areas 22 can also be in the respective inner-circumference surface of the external conical ring, as is indicated in dotted lines on the left side of FIG. 6 with the external conical ring 48', where a drop down 66' is placed.

An axial reduction of the zone 21' of force transfer on the inner circumference 4 of the hub 3 has also been realized here with simple resources vis-à-vis the zone 35 of force transfer on the cylindrical outer-circumference surface 2 of the shaft 1.

What is claimed is:

1. A conical clamping set for connecting an inner component with a cylindrical outer-circumference surface with an external component with a recess with a cylindrical inner-circumference surface, which set is intended to be located in a radial clearance between the cylindrical outer-circumference surface of the inner component and the cylindrical inner-circumference surface of the recess of the external component comprising, at least two inner conical rings, each having a cylindrical inner-circumference surface for application to the cylindrical outer-circumference surface of the inner component, and a conical outer-circumference surface, a thin-walled, external, double-cone ring with conical, inner-circumference surfaces, the ends of which are turned towards each other and fitting in parallel engagement against the outer-circumference surfaces of the at least two inner conical rings, the double-cone ring further including a cylindrical outer-circumference surface for application on the inner-circumference surface of the external component, at least two axial clamping screws distributed over the circumferences of the at least two conical rings, allowing the conical rings to be axially pulled against one another thereby sliding down over the conical surfaces of the double-cone ring and expanding the double-cone ring radially outwardly thereby generating radial clamping forces acting against the outer-circumference surface of the inner component and the inner-circumference surface of the recess of the external component, the double-cone ring having a radial step down going through in the direction of the circumference in its cylindrical outer-circumference surface and being substantially in the center of its axial extension on an axial section, so that the axial extension of an outer zone of forces in the cylindrical outer-circumference surface of the double cone ring, in which the radial clamping forces are transferred to the inner-circumference surface of the recess of the external component, is smaller than the axial extension of an inner zone of forces, in which the radial clamping forces act against the outer-circumference surface of the inner component.

2. The conical clamping set of claim 1, wherein the double-cone ring has a centering crosspiece projecting radially inwards in the center and has a cylindrical inner-circumference surface for application to the outer-circumference surface of the inner component and said axial clamping screws reach through the centering crosspiece in clearance holes.

3. The conical clamping set of claim 1, wherein the axial extensions of the inner and outer zones of forces are coordinated with each other such that an outer surface pressure at the inner-circumference surface of the external component and an inner surface pressure at the outer-circumference surface of the inner component are essentially equal.

4. The conical clamping set of claim 1, wherein the double-cone ring is not slit in the axial direction.

5. A conical clamping set for connecting an inner component with a cylindrical outer-circumference surface with an external component with a recess with a cylindrical inner-circumference surface, which set is intended to be located in a radial clearance between the cylindrical outer-circumference surface of the inner component and the cylindrical inner-circumference surface of the recess of the external component comprising, at least two thin-walled outer conical rings, each having a conical, inner-circumference surface having thick-walled ends, said thick-walled ends being turned towards each other, and having a cylindrical outer-circumference surface, at least two inner conical rings, each having a conical, outer-circumference surface fitting in parallel engagement against the inner-circumference surfaces of one of the at least two outer conical rings, and each having an inner-circumference surface, at least two axial clamping screws distributed over the circumference of the inner conical rings, allowing the inner conical rings to be axially pulled against one another thereby sliding down over the conical surfaces of the at least two outer conical rings and expanding the at least two outer conical rings radially outwardly thereby generating radial clamping forces acting against the outer-circumference surface of the inner component and the inner-circumference surface of the recess of the external component, said outer-circumference surfaces of the at least two outer conical rings being stepped down over an axial extension to a smaller diameter so that the axial extension of an outer zone of forces in the cylindrical outer-circumference surface of the at least two outer conical rings, in which the radial clamping forces are transferred to the inner-circumference surface of the recess of the external component, is smaller than the axial extension of an inner zone of forces in which the radial clamping forces act against the outer-circumference surface of the inner component.

6. The conical clamping set of claim 5, including an inner, double-cone ring having a cylindrical inner-circumference surface for application to the cylindrical outer-circumference surface of the inner component, and having a centering crosspiece projecting radially outwardly in the center having a cylindrical outer-circumference surface for application to the cylindrical inner-circumference surface of the external component between the at least two outer conical rings.

7. The conical clamping set of claim 5, wherein the axial extensions of the inner and outer zones of forces are coordinated with each other such that an outer surface pressure at the inner circumference surface of the external component and an inner surface pressure at the outer-circumference surface of the inner component are essentially equal.

8. The conical clamping set of claim 5, wherein the at least two outer conical rings are not slit in the axial direction.

* * * * *